United States Patent
Icolari et al.

(10) Patent No.: US 11,805,000 B2
(45) Date of Patent: Oct. 31, 2023

(54) WIRELESS TELECOMMUNICATION BASE STATION AND PROCESS FOR HIGH-MOBILITY SCENARIOS

(71) Applicant: TEKO TELECOM S.r.l., Castel San Pietro Terme (IT)

(72) Inventors: Vincenzo Icolari, Castel San Pietro Terme (IT); Massimo Notargiacomo, Castel San Pietro Terme (IT); Rodney Bryant, Castel San Pietro Terme (IT); Stephen Turner, Castel San Pietro Terme (IT)

(73) Assignee: TEKO TELECOM S.r.l., Castel San PietroTerme (IT)

( * ) Notice: Subject to any disclaimer, the term of this patent is extended or adjusted under 35 U.S.C. 154(b) by 79 days.

(21) Appl. No.: 17/429,273

(22) PCT Filed: Feb. 26, 2020

(86) PCT No.: PCT/IB2020/051629
§ 371 (c)(1),
(2) Date: Aug. 6, 2021

(87) PCT Pub. No.: WO2020/174412
PCT Pub. Date: Sep. 3, 2020

(65) Prior Publication Data
US 2022/0086031 A1    Mar. 17, 2022

(30) Foreign Application Priority Data
Feb. 26, 2019 (IT) .......................... 102019000002785

(51) Int. Cl.
*H04L 27/26* (2006.01)
*H04L 1/20* (2006.01)
*H04W 56/00* (2009.01)
*H04B 17/336* (2015.01)

(52) U.S. Cl.
CPC ............ *H04L 27/2657* (2013.01); *H04L 1/20* (2013.01); *H04W 56/0035* (2013.01); *H04B 17/336* (2015.01)

(58) Field of Classification Search
None
See application file for complete search history.

(56) References Cited

U.S. PATENT DOCUMENTS

| | | |
|---|---|---|
| 5,287,388 A | 2/1994 | Ogura et al. |
| 2006/0140312 A1* | 6/2006 | Bune ....................... H04L 1/206 375/341 |
| 2008/0108367 A1* | 5/2008 | Afrashteh ............. H04W 48/18 455/452.2 |

(Continued)

*Primary Examiner* — Andrew C Oh
(74) *Attorney, Agent, or Firm* — ASLAN LAW, P.C.

(57) ABSTRACT

A wireless telecommunications base station that compensates for Doppler shift in each connected User Equipment. The base station deploys a plurality of parallel receivers, each with a given frequency offset above and below the carrier frequency. Each receiver performs a frequency shift on a common uplink signal, determines the quality of the frequency shifted uplink signal, and demodulates the frequency shifted uplink signal. A selector/combiner module generates a highest quality demodulated signal, which may be done by selecting the frequency shifted uplink signal or soft combining a subset of frequency shifted uplink signals having a sufficiently high quality.

15 Claims, 7 Drawing Sheets

(56) References Cited

U.S. PATENT DOCUMENTS

| | | | |
|---|---|---|---|
| 2008/0182582 A1* | 7/2008 | Bachl | H04L 27/2657 455/446 |
| 2009/0219786 A1* | 9/2009 | Laurent | H04L 27/2613 367/134 |
| 2011/0007694 A1* | 1/2011 | Kim | H04L 27/2676 370/329 |
| 2012/0056779 A1* | 3/2012 | Freking | G01S 7/5273 342/189 |
| 2013/0003568 A1* | 1/2013 | Xie | H04L 27/2675 370/252 |
| 2013/0070750 A1* | 3/2013 | Kim | H04W 56/0085 370/350 |
| 2014/0029648 A1* | 1/2014 | Jin | H04B 1/71072 375/148 |
| 2019/0349057 A1* | 11/2019 | Davydov | H04B 7/0626 |
| 2022/0086031 A1* | 3/2022 | Icolari | H04L 27/2657 |

\* cited by examiner

WIRELESS TELECOMMUNICATION BASE STATION AND PROCESS FOR HIGH-MOBILITY SCENARIOS

CROSS-REFERENCE TO RELATED APPLICATIONS

This application claims priority to IT Patent Application No. 102019000002785 filed on Feb. 26, 2019, and this application claims priority to and is a 371 of international PCT Application No. PCT/IB2020/051629 filed on Feb. 26, 2020, the entire contents of which are hereby incorporated by reference.

TECHNICAL FIELD

The present invention relates to a wireless telecommunication base station and related process for high-mobility scenarios, and more particularly, to a process and system for providing a high-quality uplink to wireless devices in high-mobility settings.

BACKGROUND ART

With complex telecommunications standards such as LTE and 5G, given the vast amount of data being packed into subframes of RF spectra, receiver decoding performance can be seriously degraded by the Doppler Effect if a given User Equipment (UE) is moving rapidly relative to the base station (eNodeB or gNodeB). This is due to the Doppler shift in the carrier frequency of the transmitting UE. Given a sufficient Doppler shift, interference between subcarriers of an OFDM (Orthogonal Frequency Division Multiplexing) system may occur and the Bit Error Rate (BER) experienced by the receiver may increase. An increase in BER may cause the base station to instruct the UE to step down its modulation scheme to one with a much lower rate.

Conventional solutions to the Doppler shift problem involve predicting the speed of a UE and thereby estimating a Doppler shift in the carrier frequency necessary to compensate and then apply an appropriate carrier frequency offset. Computationally heavy estimation and tracking algorithms are known for these purposes. However, there are shortcomings to this approach. First, in a typical high-mobility scenario, different UEs may be moving at different speeds relative to the receiver. This makes it extremely difficult to estimate and track each UE connected to the receiver. Second, the quality of the link is only as good as the estimation of each UE's speed at the particular instant of estimation. If the estimation is off, the connection can be severely degraded. Third, in a highly dynamic high-mobility environment, UEs may experience sudden Doppler transitions and changes that are difficult to predict. This is particularly true in which UEs are in nearby vehicles that may change speed suddenly or pass very rapidly near a receiver antenna.

Accordingly, what is needed is a receiver that can account for and mitigate Doppler shifts in the uplink transmissions from multiple UEs, wherein each of the UEs may be moving at different speeds and in highly dynamic conditions, in which the mitigation does not rely on computationally heavy and unreliable estimation and tracking techniques.

DESCRIPTION OF THE INVENTION

The main aim of the present invention is to provide a receiver that can account for and mitigate Doppler shifts in the uplink transmissions from multiple UEs, wherein each of the UEs may be moving at different speeds and in highly dynamic conditions, in which the mitigation does not rely on computationally heavy and unreliable estimation and tracking techniques.

Another object of the present invention is to provide a

The above-mentioned objects are achieved by the present parallel receiver architecture and process for high-mobility scenarios according to the features of claim 1.

An aspect of the present invention involves a wireless telecommunications base station. The base station comprises a coordinator module that determines a plurality of frequency offsets relative to a carrier frequency; a plurality of receivers, wherein each of the plurality of receivers receives a distinct frequency offset within the plurality of frequency offsets, shifts an incoming signal at the carrier frequency by its corresponding frequency offset to generate a frequency shifted signal, and determines a signal quality measurement corresponding to its frequency shifted signal; and a selector/combiner module that receives the frequency shifted signal and signal quality measurement from each of the plurality of receivers, generates a highest quality frequency shifted signal and sends the highest quality frequency shifted signal to an upper layer protocol stack.

Another aspect of the present invention involves a wireless telecommunications base station. The base station comprises a coordinator means for determining a plurality of frequency offsets relative to a carrier frequency; a plurality of receiver means for receiving a corresponding frequency offset, receiving a signal, applying the corresponding frequency offset to the signal to generate a frequency shifted signal, and computing a signal quality measurement corresponding to the frequency shifted signal; and a selector/combiner means for receiving the frequency shifted signal and signal quality measurement from each of the plurality of receiver means and generating a highest quality frequency shifted uplink signal.

Another aspect of the present invention involves a non-transitory computer readable memory encoded with instructions which, when executed by one or more processors, cause the one or more processors to perform a process. The process comprises determining a plurality of frequency offsets; assigning each of the plurality of frequency offsets to one of a plurality of receivers; frequency shifting an incoming signal by each of the plurality of frequency offsets to create a plurality of frequency shifted signals; calculating a signal quality measurement corresponding to each of the plurality of frequency shifted signals; and generating an output signal based on the plurality of frequency shifted signals and the plurality of corresponding quality measurements.

BRIEF DESCRIPTION OF THE DRAWINGS

Other characteristics and advantages of the present invention will become better evident from the description of a preferred, but not exclusive embodiment of a parallel receiver architecture and process for high-mobility scenarios, illustrated by way of an indicative but non-limiting example in the accompanying Figures, in which.

EMBODIMENTS THE INVENTION

Figure 1:
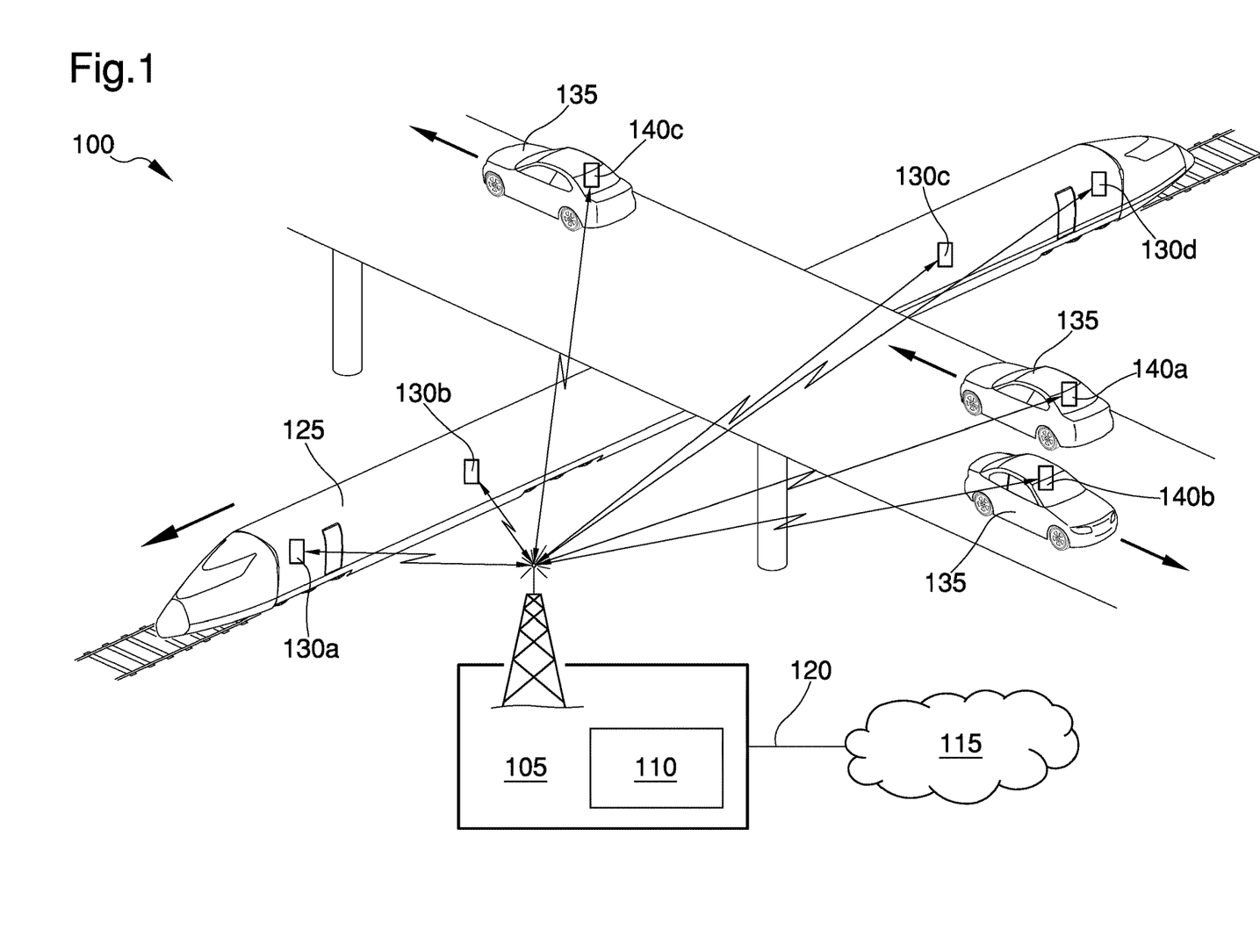
FIG. 1 illustrates a scenario in which a base station is connected to a plurality of UEs undergoing independent Doppler shifts.

FIG. 1 illustrates an exemplary base station deployment 100 in which a wireless telecommunications base station 105 (e.g., an eNodeB) is connected to multiple UEs. As illustrated, UE 130a, 130b, 130c, and 130d are aboard a high speed train 125 that is moving past eNodeB 105 in close proximity and at a high rate of speed. At the moment illustrated each of the UEs 130a-d experience different Doppler shifts in carrier frequency relative to eNodeB 105. In this example, at the moment illustrated, UE 130a experiences a large negative Doppler shift, and UE 130d experience a large positive shift, due to the fact that they are respectively moving away from and toward eNodeB 105. UEs 130b and 130c respectively experience negative and positive Doppler shifts, but at a lesser magnitude in shift relative to UEs 130a and 130d.

Further illustrated is vehicular traffic involving several vehicles 135, each of which may have one or more UEs 140a, 140b, and 140c. One or more of the UEs 140a-c may be integral to the vehicles themselves or may be user mobile handsets. One difference between the vehicles 135 and train 125 is that train 125 is likely moving at a constant or near constant speed, whereas each of the vehicles 135 may be accelerating suddenly and in a non-linear fashion, which is typical in an urban traffic setting. The significance of the chaotic speed of the vehicles 135 is that it may be impossible to estimate the speed of a given vehicle 135 at a given time, whereas it may be possible to estimate the speed of train 125 at any given time with reasonable precision, even though speed and Doppler shift estimation as described above would still suffer numerous drawbacks. Conventional approaches to channel modelling are defined in 3GPP Technical Specifications TS 36.101, and TS 36.104.

As illustrated in FIG. 1, eNodeB 105 may have a baseband processor 110 that performs the RAN (Radio Access Network) functions of a given standard, such as LTE. Further, eNodeB 105 may be coupled to the internet via a backhaul connection 120. Further, although the term eNodeB may be used in this example, it will be understood that the same description may apply to a 5G gNodeB.

A key aspect of base station deployment 100 is that it may involve many UEs, each of which may be moving at different speeds relative to eNodeB 105, and at speeds that may be changing independently and randomly.

Figure 2:
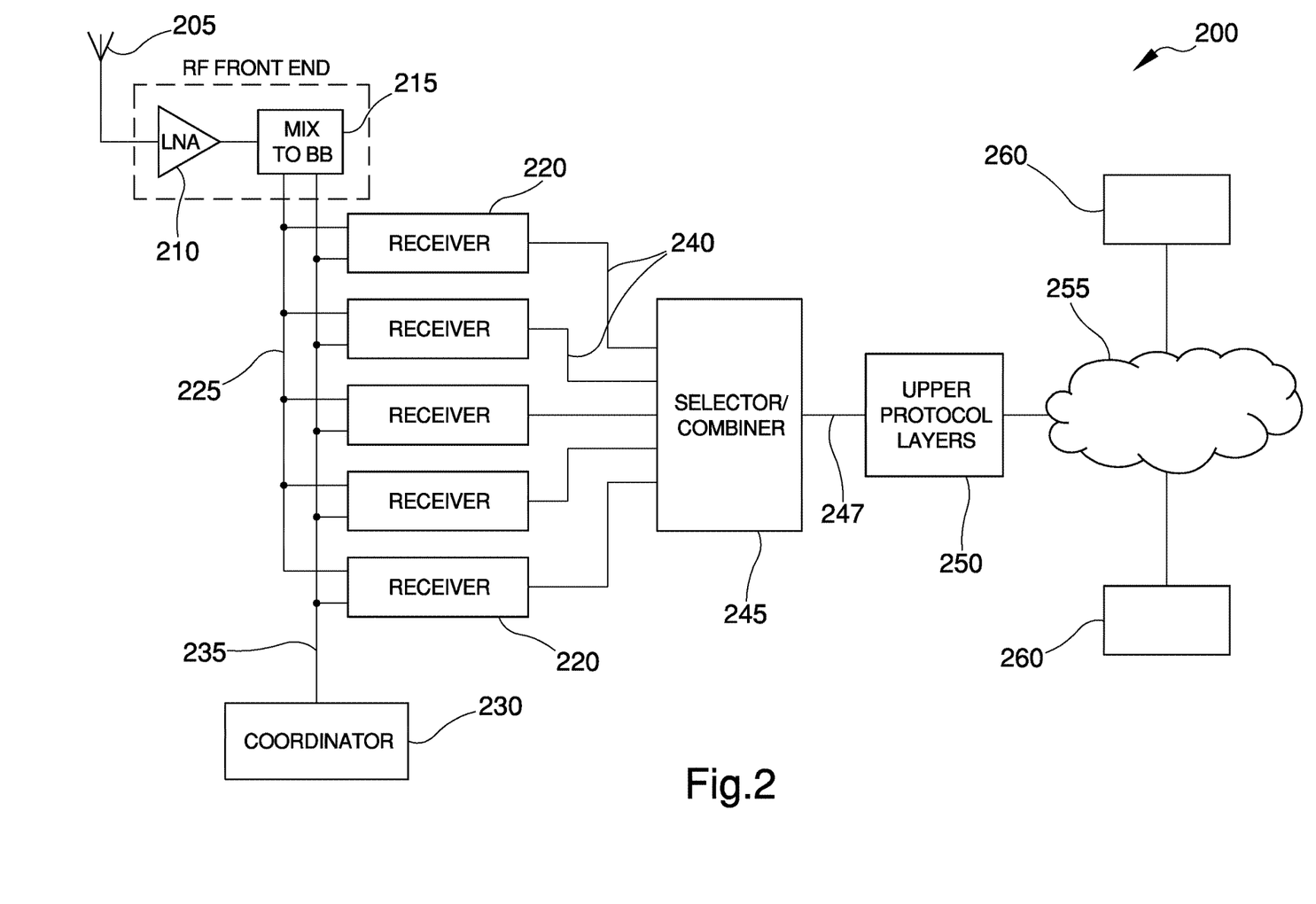
FIG. 2 illustrates an exemplary system for mitigating Doppler shifts for multiple UEs.

FIG. 2 illustrates an exemplary system 200 for mitigating Doppler shifts according to the disclosure. System 200 may be deployed substantially within the baseband processor 110 illustrated in FIG. 1. System 200 may include an antenna 205, which is coupled to a Low Noise Amplifier (LNA) 210. LNA 210 may be coupled to a mixer 215 that mixes the amplified RF signal from antenna 205 from its carrier frequency $f_c$ to an analog baseband signal 225 using a local oscillator (not shown). The combination of LNA 210 and mixer 215 may be referred to as an RF front end. System 200 further includes a plurality of receivers 220, each of which is fed analog baseband signal 225. Each receiver 220 shifts the frequency of the baseband signal 225 by a specific frequency offset 235, which is provided to each receiver 220 by coordinator module 230. The frequency offset 225 may be zero for one of the receivers 220 and increasingly negative and positive for the others. Each frequency offset 235 may corresponding to a Doppler shift in carrier frequency resulting from a UE being in motion relative to eNodeB 105. This is described further below.

Each receiver 220 performs PHY layer functionality on its frequency-shifted baseband signal 225 and outputs a corresponding frequency shifted signal 240. Particularly, each frequency shifted signal 240 is a UE signal set, which may include the PUCCH (Physical Uplink Shared Channel), PUSCH (Physical Uplink Shared Channel), PRACH (Physical Random Access Channel) and SRS (Sounding Reference Signal) for each connected UE in base station deployment 100. Each UE signal set 240 corresponds to the UE uplink (UL) signal received at a given Doppler offset to the carrier frequency and may include data indicating the quality of the received signal from the corresponding UE at a given Doppler frequency offset, which is described further below. Each receiver 220 may be substantially similar and may be implemented as pure software-based virtual subsystems that runs on generic hardware, or they may be implemented in specific hardware, or a mix of special purpose hardware and software. It will be understood that such variations are possible and within the scope of the disclosure. The specific functions of receivers 220 are described in more detail below.

Selector/combiner module 245 receives each UE signal set 240 from each receiver 220 and either selects the signal set 240 having the highest signal quality (i.e., compensated for Doppler shift) or soft combines the respective PUCCH, PUSCH, and SRS from the receivers to compute a best solution, or a combination of the two. In doing so, selector/combiner module 245 may populate a plurality of data arrays, one for each UE, having select data from each UE signal set, as a function of frequency offset. With this data, as mentioned above, selector/combiner module 245 may either select the signal from the receiver 220 having the strongest signal or combine some or all of the corresponding signals from a given UE across the frequency offsets to compute a soft-combined signal. This is described in more detail below.

Selector/combiner 245 outputs a single signal set 247 for each UE to the upper protocol layers 250 for further processing according to the appropriate communications protocol.

Particularly, the single signal set 247 is a highest quality frequency shifted signal.

The resulting UL signals are then transmitted to the appropriate network operator core network 260 via internet 255 according to the given standard.

Figure 3:
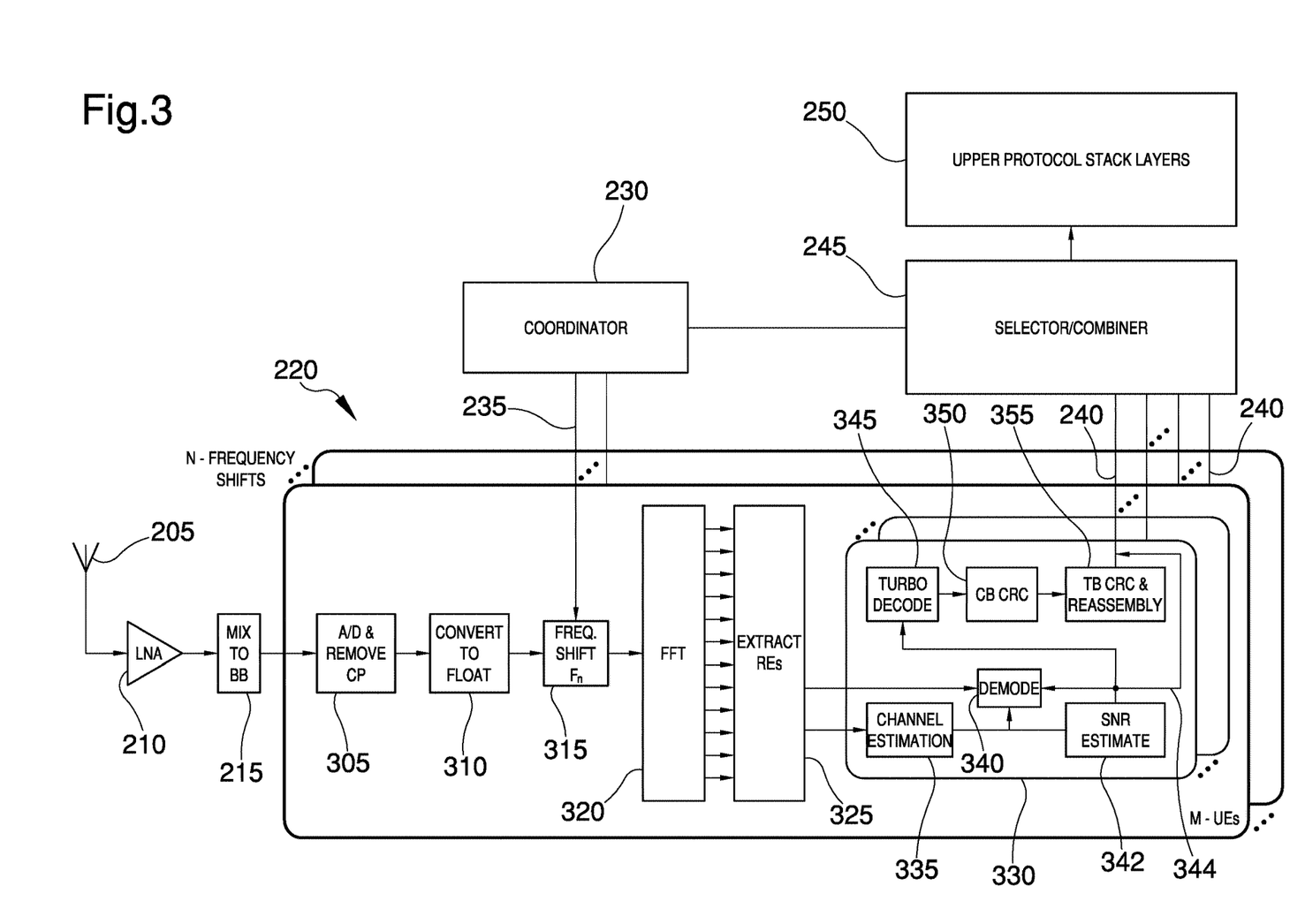
FIG. 3 illustrates an exemplary receiver for processing uplink signals at multiple frequency offsets.

FIG. 3 illustrates system 200, along with a plurality of exemplary receivers 220 according to the disclosure. As illustrated, there are N receivers 220, each one having a different frequency offset (including one with zero offset). As mentioned above, each receiver 220 receives a baseband signal 225 from the mixer 215. The component blocks 305-355 within receiver 220 may be seen as functions as well as component modules. In the former case, the partitioning provided within receiver 220 in FIG. 3 may vary. In the case of a pure virtual software implemented receiver 220, the functions of components 305-355 may be implemented in a plurality of threads running on one or more processor cores within one or more server boards of baseband processor 110. In this case, the functions of blocks 305-355 may be encapsulated in a set of machine-readable instructions that are stored on a non-transitory memory and executed on computer hardware. As used herein, the term "non-transitory memory" may refer to any tangible storage medium (as opposed to an electromagnetic or optical signal) and refers to the medium itself, and not to a limitation on data storage (e.g., RAM vs. ROM). For example, non-transitory memory may refer to an embedded memory that is encoded with instructions whereby the memory may have to be re-loaded with the appropriate machine-readable instructions after being power cycled. Accordingly, receiver 220 may be described as a sequence of functional blocks or equally well as a sequence of steps executed by one or more processors (hereinafter referred to as the processor) within the compute environment of baseband processor 110.

In the block 305, the processor executes instructions to convert the analog baseband signal 225 into a digital signal. The processor may do so using A/D hardware on the corresponding server board. Alternatively, the A/D function of block 305 may be performed within the mixer module 215 or between mixer module 215 and receivers 220, in which case the baseband signal 225 may be a digital baseband signal. Further to block 305, the processor removes the Cyclic Prefix from the digital baseband signal according to the telecommunications standard. Accordingly, the output of block 305 is a series of digitized symbols, each of which may have, for example, 2048 samples. The 2048 samples I/Q (in-phase/quadrature) data representing the time domain signal received by antenna 205.

In block 310, the processor may execute instructions to convert the digitized I/Q data into 32 bit floating point representation. Doing so greatly increases the dynamic range of further processing in processing chain of receiver 220. Further, in the case of a pure software virtual baseband processor, converting the data to 32 bit float representation has an additional advantage in that conversion to floating point representation and subsequent processing is enabled by floating point calculation engines present in server processor hardware. This may enable higher precision high speed processing that may be dynamically provisioned among servers in, for example, a cloud computing environment. Although there are advantages to converting the digitized I/Q data into floating point format, it will be understood that this step is optional, and that the disclosed steps may also be performed on binary integer data.

In block 315, the processor executes instructions to frequency shift the 32 bit I/Q baseband signal corresponding to the frequency offset 235 provided by coordinator module 230. This may be done as follows. The input 32 bit I/Q baseband data may be represented as r(k), where k is a discrete time index corresponding to the given I/Q baseband sample. In block 315, the processor may apply a frequency shift to the incoming I/Q baseband sample as follows:

$$r_{shift}(k) = r(k)e^{j2\pi k \frac{f_n}{f_s}}$$

where $f_n$ is the frequency offset 235 provided to the $n^{th}$ receiver 220 by coordinator 230, and $f_s$ is the sampling frequency. Accordingly, each receiver 220 calculates a stream of discrete frequency shifted baseband I/Q data, each at a different designated Doppler frequency offset. It will be understood that different code-specific implementations of the above equation are possible and within the scope of the disclosure.

In block 320, the processor executes instructions to perform an FFT (Fast Fourier Transform) on the block of 2048 samples of digitized frequency-shifted time-domain baseband I/Q data, thereby converting it to digital frequency domain data. Block 320 may be performed using conventional procedures in accordance with 3GPP specifications. As each subsequent set of 2048 time domain samples is sequentially processed, the processor reconstructs a data frame composed of Resource Elements (REs).

In block 325, the processor executes instructions to extract the relevant designated REs from the frequency domain data pertaining to each connected UE. In doing so, data pertaining to each UE's PUCCH (Physical Uplink Control Channel), PUSCH (Physical Uplink Shared Channel), and SRS (Sounding Reference Signals) are extracted for further baseband processing. For the purposes of the disclosure, the processing of the PUSCH (in the context of an LTE implementation) will be described further.

Block 330 illustrates the processing of a single UE's PUSCH according to the disclosure. As illustrated, there are M parallel processing blocks 330, each corresponding to one of the M UEs. It will be understood that other processing according to the 3GPP specification is performed on various other channels (e.g., PUCCH, PRACH, etc.) for each of the UEs, and although not shown or described here, is part of the processing implemented by baseband processor 110.

In block 335, the processor executes instructions to assemble the REs corresponding to a particular UE's PUSCH and perform a Channel Estimation corresponding to each UE's data, resulting in a reporting of conventional parameters such as Channel State Information (CSI), including Channel Quality Indicators (CQI), etc., as specified in 3GPP TS 36.213, which block 335 reports to the Demodulation block 340 and SNR Estimation block 342, described further below.

In block 340, the processor executes instructions to assemble the REs corresponding to a particular UE's PUSCH and demodulate the assembled 32 bit floating point I/Q data. Demodulation of the signal from the UE may be implemented using conventional procedures. However, the use of 32 bit floating point data may provide for a more precise (and thus more robust) demodulation solution. This is particularly true for higher order modulation schemes (e.g., 16-QAM, 64-QAM, and 256-QAM), whereby the improved dynamic range and precision of 32 bit floating point arithmetic (vs. 16 bit integer) potentially reduces the bit error rate at these modulation schemes. The result of block 340 is a codeword having a set of "master" CRC (Cyclic Redundancy Check) bits.

In block 342, the processor executes instructions to determine the quality of the UL signal from a given UE at a specific Doppler frequency offset. An example of a quality assessment is to calculate the SNR (Signal to Noise Ratio) of the digital signal demodulated in step 340. The SNR may be calculated using Maximum Likelihood Estimation techniques along with MMSE (Minimum Mean-Square Error) Equalization. Both techniques are known to the art and it will be understood that various implementations of these techniques are possible and within the scope of the disclosure. In an example, the processor executes instructions to compute the SNR using a Data Aided Maximum Likelihood algorithm on the frequency domain Demodulation Reference Signals (DM-RS) present in the UL I/Q data from a given UE. The result of step 342 is a SNR estimation 344 that later gets passed to the selector/combiner 245 within the UL signal set data 240, along with the corresponding reassembled packet data that were extracted from the same Resource Blocks of I/Q data as the DM-RS. As mentioned, the SNR corresponds to the quality of the UL signal received with a given Doppler frequency compensation (via frequency offset 235 provided to receiver 220 by coordinator 230).

Channel Estimation block 335 and SNR Estimate block 342, although illustrated as distinct blocks, may operate concurrently on the PUSCH data assembled by block 335. It will be understood that such variations are possible and within the scope of the disclosure.

In block 345, the processor executes instructions to perform turbo decoding according to the disclosure. This includes the standard processes of de-interleaving and de-scrambling the demodulated codeword to form a set of code blocks. The length of the code block in bytes is a function of the modulation scheme employed by the corresponding UE at the time of transmission, along with a code rate. Specifics for these blocks may be found in 3GPP TS 36.212. Block 345 continues with the turbo decoding function, resulting in a reconstructed and decoded codeblock. The processor performs a codeblock CRC check in block 350, and in block 355, performs the "master" CRC check and reassembles the transport block of demodulated packet data transmitted by the UE. The processor then sends the demodulated UE signal set 240 to the selector/combiner. This may include information regarding the number of CRC failures experienced in blocks 345.

Selector/combiner 245 receives a UE signal set 240, each at each Doppler frequency offset (i.e., from each block 330 within each receiver 220) along with corresponding SNR estimation 344 (computed in step 342), and may include the number of CRC failures determined in block 345. For selector/combiner 245, the processor executes instructions to, on a UE-by-UE basis, select the UE signal set 240 from the receiver 220 that has the highest signal quality based on the SNR estimation 344 and results of the CRC checks performed in each of the corresponding blocks 345 for a given UE. Alternatively, the selector/combiner 245 may select all of the incoming UE signal sets 240 and perform a soft combine on the data to provide a higher fidelity representation of the transmitted UL data, which may include using the SNR estimation 344 as weights for performing a weighted sum. Further to this alternative, only a subset of incoming UE signal sets 240 may be summed in a soft combine. In this case, the processor may execute instructions to select only those PUCCH and PUSCH data (from UE signal sets 240) whose corresponding SNR estimations 344 are above a certain threshold. It will be apparent that such variations are apparent and within the scope of the invention.

The output of the selector/combiner 245 is a single Doppler-compensated PUCCH and PUSCH data for each UE, which is input to the remaining upper protocol layers 250. The upper protocol layers 250 may be according to a standard 3GPP implementation, such as LTE, whereby the upper protocol layers 250 need not be aware of the existence of the Doppler compensation being performed in the receivers 220 and selector/combiner 245, or that there are multiple receivers 220. Selector/combiner 245 may also provide status information to coordinator 230, which may include all or some of the computed SNR estimates 340 as a function of UE and/or frequency offset, along with the identity of the selected receiver 220 or soft combined summation of a subset of the receivers 220.

Figure 4A:
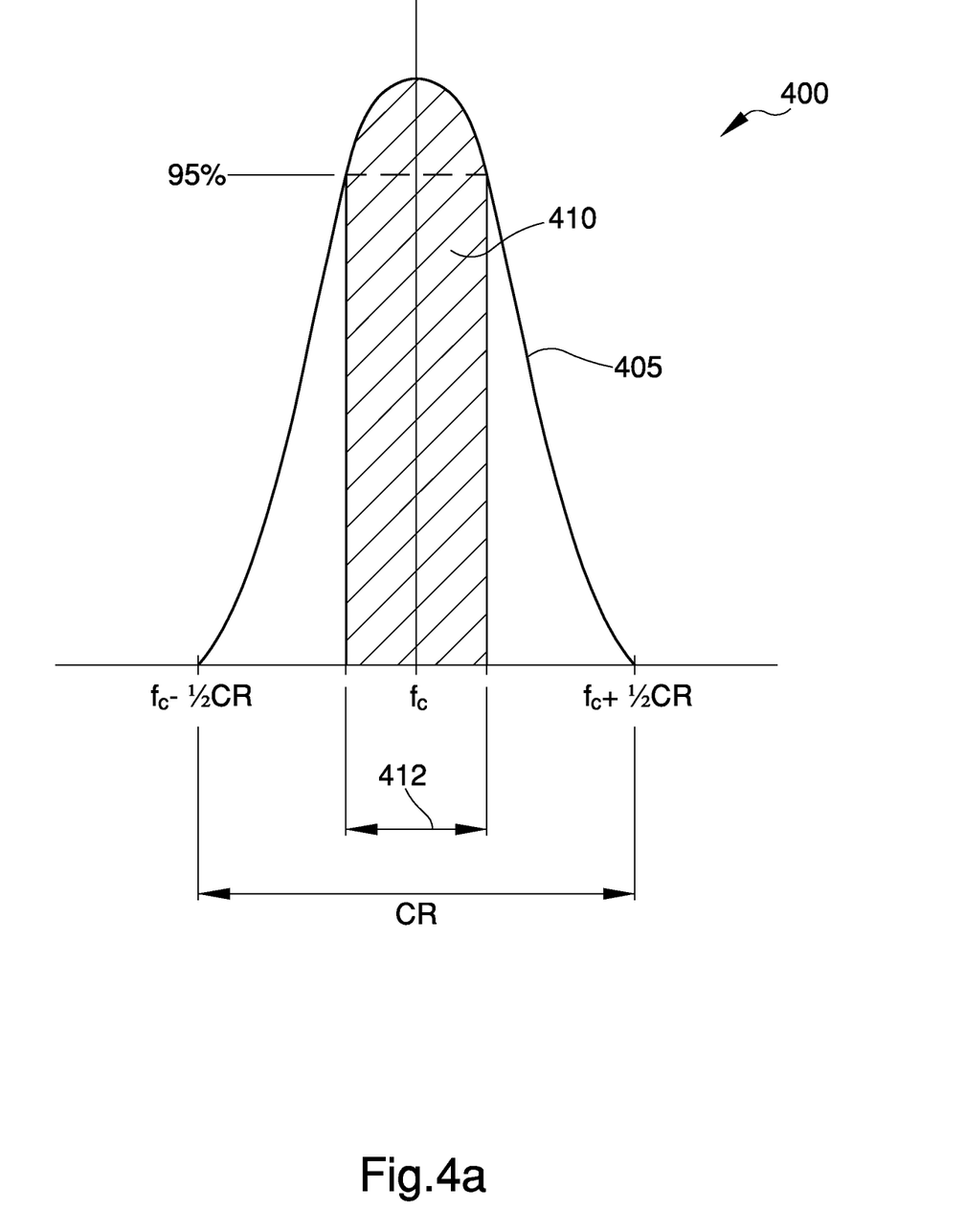
FIG. 4a illustrates an exemplary carrier frequency capture range with no frequency offset.

FIG. 4a illustrates an exemplary spectral capture range window 400 for an incoming OFDMA or SC-FDMA signal. The x-axis corresponds to frequency, centered on the carrier frequency $f_c$. The y-axis corresponds to the probability of successfully decoding the incoming signal as a function of frequency shift greater and less than the carrier frequency $f_c$. This may be depicted as a capture probability curve 405, which spans a frequency capture range CR. As illustrated, there is a high probability band 410 having a frequency range 412 around the carrier frequency, whereby the high probability band 410 corresponds to a 95% probability of successfully decoding a high modulation rate (e.g., 256-QAM) UL signal. An example frequency range 412 value may be between 450 Hz and 500 Hz. The width of CR, and thus the width of frequency range 412, depends on the modulation scheme, whereby the higher the modulation, the narrower the CR.

Figure 4B:
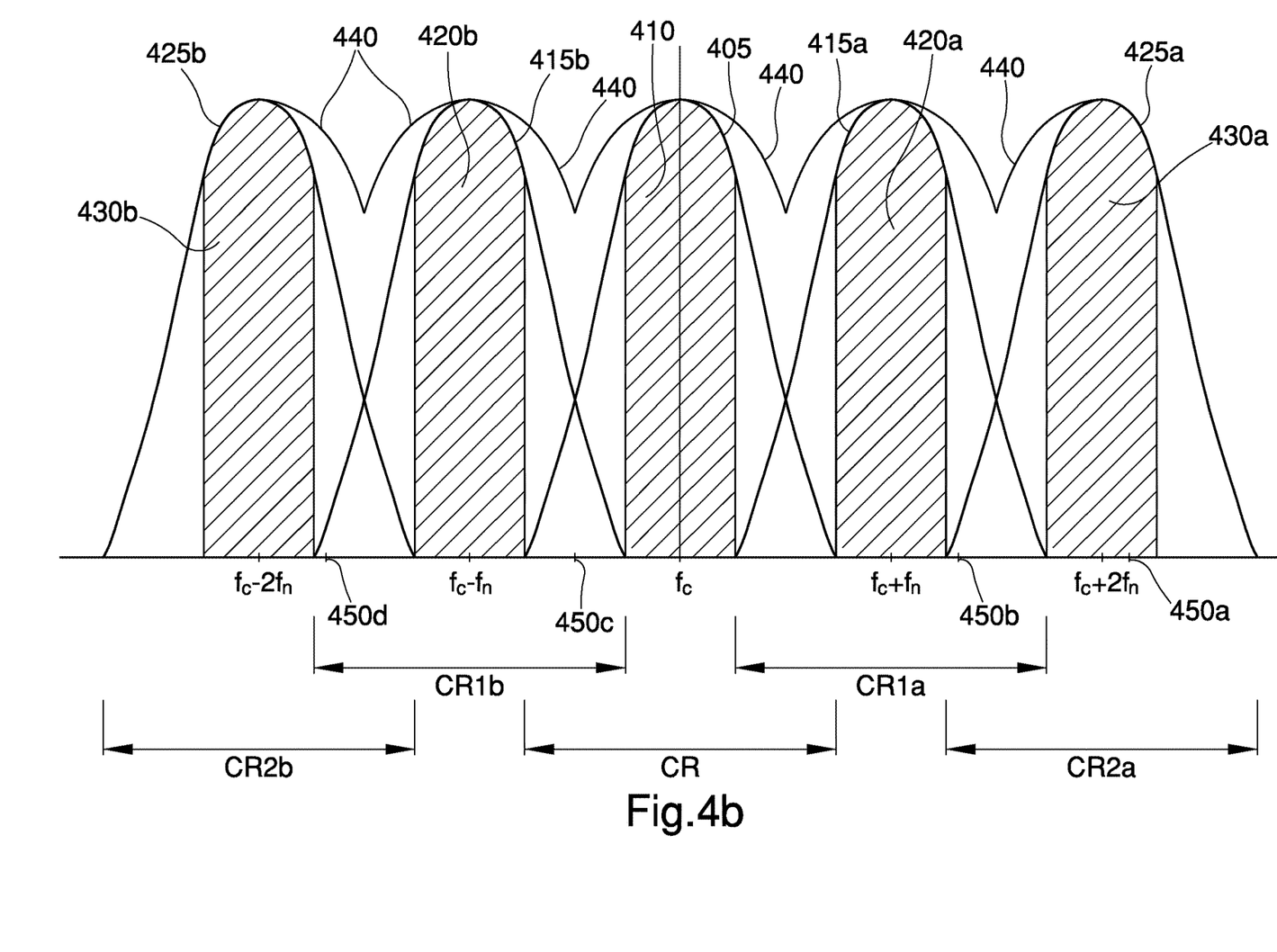
FIG. 4b illustrates an exemplary plurality of frequency capture ranges for five receivers operating simultaneously with different frequency offsets.

FIG. 4b illustrates an exemplary set of spectral capture curves for a plurality of signals, each having a different frequency offset. As illustrated, capture probability curve 405 has a zero offset and is thus centered at $f_c$ (the same as FIG. 4a) and has a capture range $CR_0$; capture probability curve 415a has a frequency offset of $f_n$, is centered at $f_c+f_n$, and has a capture range $CR_{1a}$; capture probability curve 415b has a frequency offset of $-f_n$, is centered at $f_c-f_n$, and has a capture range $CR_{1b}$; capture probability curve 425a has a frequency offset of $2f_n$, is centered at $f_c+2f_n$, and has a capture range $CR_{2a}$; and capture probability curve 425b has a frequency offset of $-2f_n$, is centered at $f_c-2f_n$, and has a capture range $CR_{2b}$. Further illustrated as an aggregate capture probability curve 440, which depicts the probability of decoding a signal regardless of which frequency offset is used. As illustrated, the aggregate capture probability curve 440 shares the same y-axis probability scale as the individual capture probability curves 405, 415a/b, and 425a/b.

The function of the disclosed system may be described in the context of FIG. 4b as follows. Referring to FIG. 1, UE 130d, which is located in the back of high speed train 125 that is passing by eNodeB 105. In this scenario, UE 130d is rapidly approaching eNodeB, resulting in a positive Doppler frequency shift 450a (in FIG. 4a). This Doppler frequency shift is located within high probability band 430a of probability curve 425a, in which case the receiver 220 having frequency offset 235 of $2f_n$ (provided by coordinator 230) as the highest probability of decoding the UL signal from UE 130d. As the high speed train 125 passes eNodeB 105, UE 130d's Doppler frequency shift will rapidly drop toward zero. At some point during the approach, UE 130d's Doppler shift may be that depicted by frequency offset 450b. In this case (Doppler shift at 450b), there is a greater probability that the receiver 220 with frequency offset $f_n$ (and probability curve 415a) will successfully decode the incoming signal and yield the highest quality estimate 344, although there is a finite probability that it is still being successfully decoded by the receiver 220 having frequency offset $2f_n$ (and probability curve 425a). The combined probability of successful decoding is shown by aggregate capture probability curve 440. As UE 130d passes eNodeB 105 and begins to move away from it, its Doppler shift will become increasing negative. Two negative Doppler frequency shifts are illustrated as frequency offsets 450c and 450d. Although this example refers to four frequency offsets 450a-d, it will be understood that the frequency offset actually sweeps from a maximum positive offset to a maximum negative offset, and that the frequency offsets 450a-d are exemplary snapshot offsets.

Figure 4C:
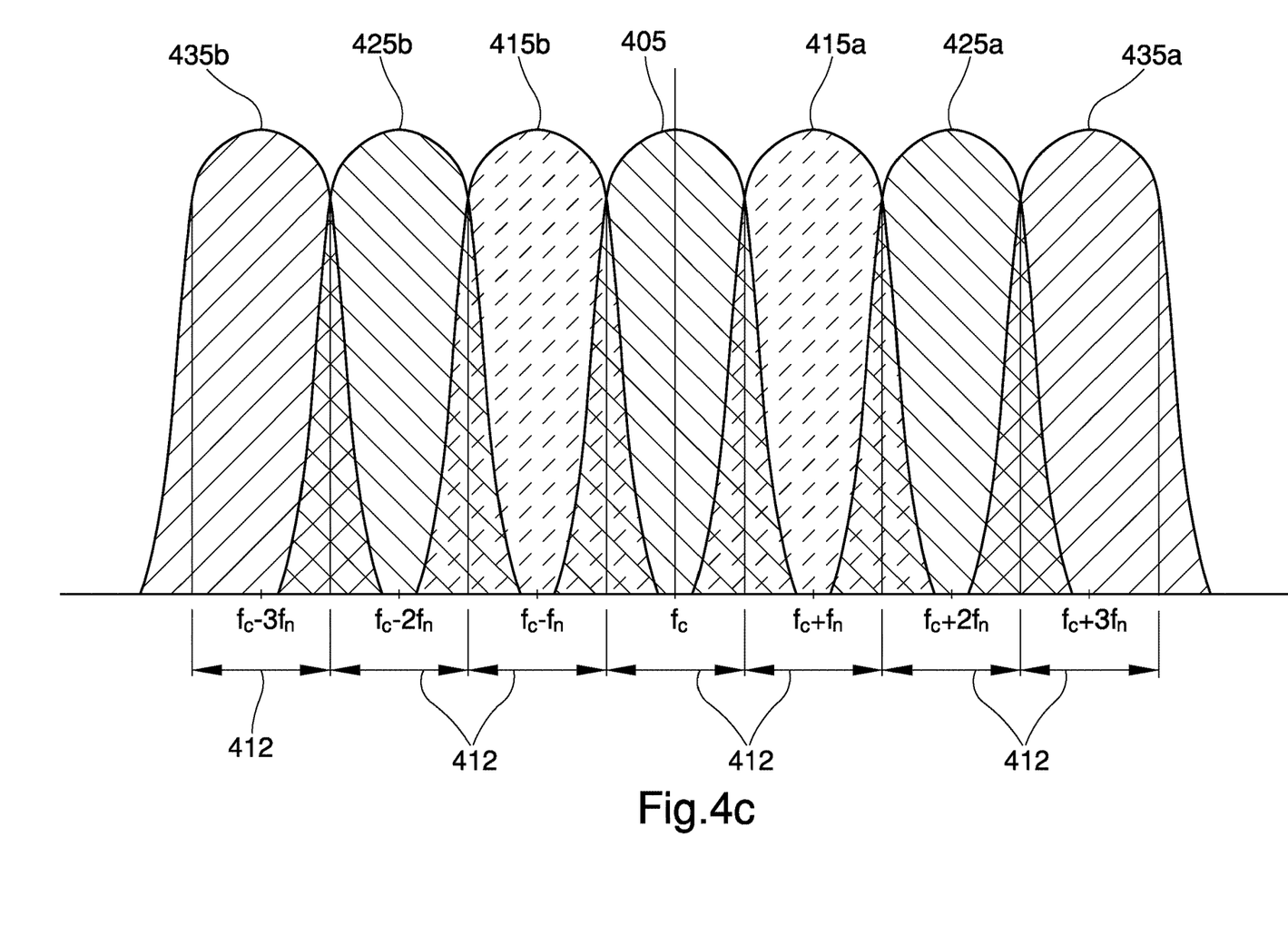
FIG. 4c illustrates an exemplary plurality of capture ranges for seven receivers operating simultaneously with tighter frequency offsets than the scenario of FIG. 4b.

FIG. 4c illustrates another exemplary set of spectral capture curves that involves seven parallel receivers 220, six of which operate at a frequency offset such that the high probability bands corresponding to the frequency offset are substantially adjacent to each other. In this example, capture probability curve 405 corresponds to a zero offset center frequency and has a high probability band frequency range 412. Adjacent to this are capture probability curves 415a and 415b, respectively having center frequencies at $f_c+f_n$ and $f_c-f_n$. The frequency offset $f_n$ may be substantially similar to the high probability band frequency range 412. Respectively adjacent to capture probability curves 415a and 415b are capture probability curves 425a and 425b, each having a respective center frequency of $f_c+2f_n$ and $f_c-2f_n$. Further, respectively adjacent to capture probability curves 425a and 425b are capture probability curves 435a and 435b, each having a respective center frequency of $f_c+3f_n$ and $f_c-3f_n$.

An advantage of the configuration of FIG. 4c is that high probability coverage may be substantially contiguous for the anticipated full range of Doppler frequency offsets. This advantage requires an additional two parallel receivers 220 to provide six different Doppler offsets to the center frequency $f_c$. It will be understood that more parallel receivers 220 may be deployed accordingly, further broadening the possible range of Doppler shift compensation.

An advantage of baseband processor 110 of the disclosure is that a given UE may maintain a high data rate modulation scheme (e.g., 64-QAM or 256-QAM) as the UE (such as UE 130d) passes eNodeB 105 at a high speed in such a way that is transparent to the upper protocol layers.

It will be understood that variations to the frequency offsets are possible and within the scope of the disclosure. For example, more or fewer frequency offsets $f_n$ (and thus receivers 220) are possible, depending on the expected maximum range of Doppler shifts, corresponding to the maximum velocity of connected UEs relative to the eNodeB 105. Further, the frequency offsets $f_n$ may be spaced closer or further apart. If closer together, the aggregate capture probability curve 440 will appear "flatter" and it will be more likely that a UE will maintain a very high rate modulation scheme (e.g., 64-QAM or 256-QAM) throughout the range of Doppler shift, but that this may require more frequency offsets and thereby require more receivers 220, which may increase the demand on the computing environment of baseband processor 110. It will further be understood that the curves illustrated in FIGS. 4a and 4b are not to scale and are used for illustration purposes.

The process according to the present invention provides a high-quality uplink to wireless devices in high-mobility settings.

Particularly, according to a preferred embodiment, a non-transitory computer readable memory is encoded with instructions which, when executed by one or more processors, cause the one or more processors to perform the process.

The steps of process may fall within the scope of coordinator 230 and may be encoded in machine readable instructions stored in a non-transitory memory and executed on one or more processors associated with baseband processor 110.

The process according to the invention comprises at least the following steps:
determining a plurality of frequency offsets;
assigning each of the plurality of frequency offsets to one of a plurality of receivers 220;
frequency shifting an incoming signal by each of the plurality of frequency offsets to create a plurality of frequency shifted signals 240;
calculating a signal quality measurement corresponding to each of the plurality of frequency shifted signals 240; and
generating an output signal based on the plurality of frequency shifted signals 240 and the plurality of corresponding quality measurements.

According to a possible embodiment, the step of generating an output signal comprises selecting a highest quality frequency shifted signal 247 from the plurality of frequency shifted signals 240.

According to a further possible embodiment, the step of generating an output signal comprises soft combining a subset of the plurality of frequency shifted signals 240 having a high signal quality measurement.

Furthermore, the step of calculating the signal quality measurement corresponding to each of said plurality of frequency shifted signals 240 comprises computing a SNR (Signal to Noise Ratio) corresponding to the frequency shifted signal 240.

The SNR can be computed using a Demodulation Reference Signal within its frequency shifted signal 240.

According to a preferred embodiment, the SNR is computed using a Data Aided Maximum Likelihood algorithm.

Furthermore, the step of determining a plurality of frequency offsets comprises:
receiving a status data corresponding to one or more recent signal quality measurement;
identifying that a first receiver corresponding to a highest magnitude positive frequency offset and a second receiver corresponding to a highest magnitude negative frequency offset are not necessary; and
de-instantiating the first receiver and the second receiver.

Alternatively, the step of determining a plurality of frequency offsets comprises:
receiving a status data corresponding to one or more recent signal quality measurements;
determining that an additional greater positive frequency offset receiver and an additional greater negative frequency offset receiver are required; and
instantiating the additional greater positive frequency offset receiver and the additional greater negative frequency offset receiver.

Figure 5A:
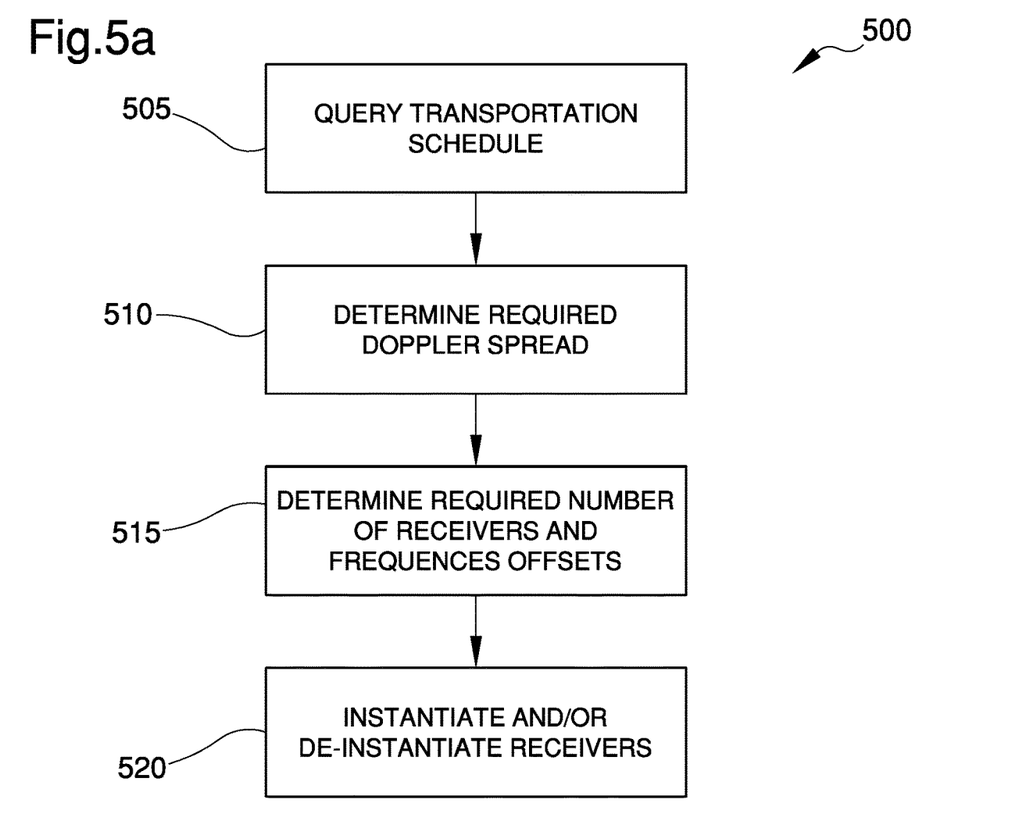
FIG. 5a illustrates an exemplary process for instantiating and de-instantiating a required set of receivers according to the disclosure, based on prior knowledge of scheduled traffic conditions.

FIG. 5a illustrates an exemplary process 500 for instantiating and de-instantiating a required set of receivers 220 according to the disclosure, based on apriori knowledge of scheduled traffic conditions. The steps of process 500 may fall within the scope of coordinator 230 and may be encoded in machine readable instructions stored in a non-transitory memory and executed on one or more processors associated with baseband processor 110. For the purposes of the discussion, it may be assumed that high speed trains 125 are considerably faster than vehicular traffic and UEs aboard a high speed train 125 may experience maximum (positive and negative) Doppler shifts greater in magnitude than those experienced by UEs aboard or integral to cars.

In step 505, the processor executes instructions to query one or more transportation schedules in order to identify times in which high speed traffic (e.g., a high speed train 125) is expected. This information may include the expected speed of the high speed traffic.

In step 510, the processor computes the expected Doppler spread to accommodate the high speed traffic. In the case of an expected high speed train 125, this may include the anticipated speed of the high speed train 125, the range (in distance) of coverage for the cell associated with eNodeB 105, and the distance from the eNodeB 105 to the nearest point of the track on which high speed train 125 will approach. Given these factors, the processor computes the required Doppler spread.

In step 515, the processor computes the required number of receivers 220 and the frequency offsets 235 to be applied to each of the receivers 220. As discussed above with respect to FIG. 4b, the closer the spacing in offset frequencies 235 may result in a more robust performance but require more computing resources. For step 515, given the available computing resources and the expected required Doppler spread, more or fewer receivers 220 may be instantiated. Further, depending on the extent of vehicular traffic 135, there may already be a currently operating set of receivers 220 operating at a given set of offset frequencies 235. In this case, it may be that additional receivers 220 may not be needed, especially if the anticipated required Doppler spread is not greater than that already handled by the current set of receivers 220.

In step 520, the processor executes instructions to instantiate the required receivers 220 and provide the required frequency offsets 235. Depending on the scheduled activity, determined in step 505, it may be that the current and anticipated required Doppler spread is less than current capability of the receivers 220. In this case, the processor may de-instantiate receivers at the high and low end of the frequency offset 235 range. In the example of FIG. 4b, the receivers 220 handling offsets $f_c+2f_n$ and $f_c-2f_n$ may no longer be needed, in which case these receivers 220 are de-instantiated.

The exemplary process 500 of FIG. 5a applies to situations in which anticipated traffic conditions are known. However, there may be an advantage to enabling baseband processor 110 to dynamically respond to changes in traffic conditions and handle unanticipated changes in high speed traffic.

Figure 5B:
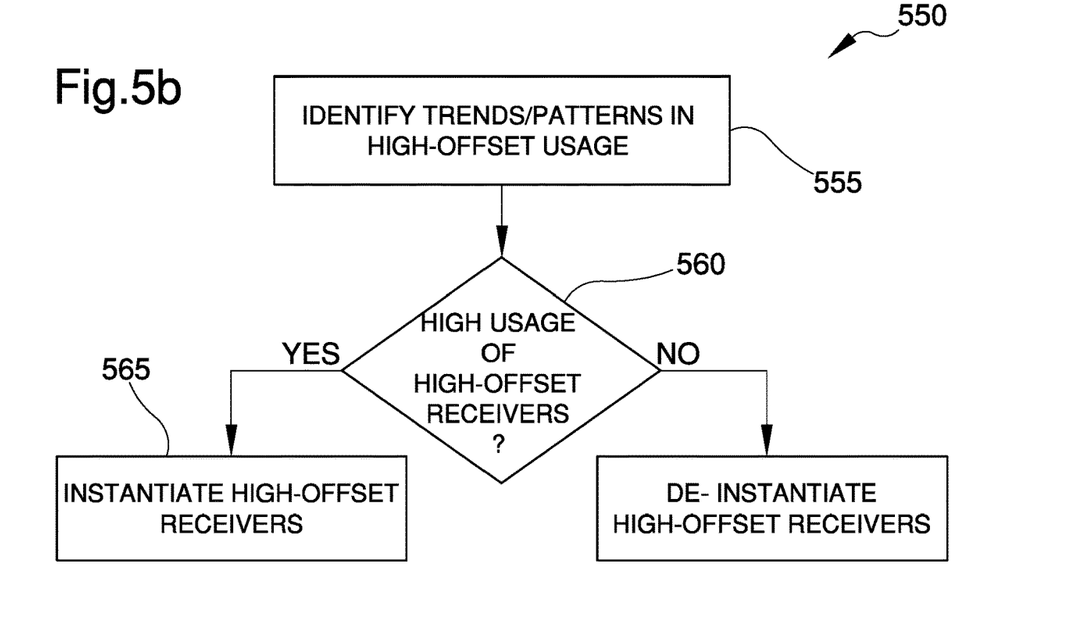
FIG. 5b illustrates an exemplary process for dynamic instantiating and de-instantiating receivers based on actual traffic conditions.

FIG. 5b illustrates an exemplary process 550 whereby baseband processor 110 dynamically responds to changes in traffic conditions and handles unanticipated changes in high speed traffic. Process 550 may be a standalone process that runs separately from process 500, or it may be a sub-process within process 500.

In step 555 the processor executes instructions to identify trends and patterns in high magnitude Doppler shifts. To do this, selector/combiner 245 (or coordinator 230) may store information regarding receiver 220 usage, including the SNR estimates 344 corresponding to each of the UEs and each of the receivers 220, and which receivers 220 were selected for relaying their respective UE's PUCCH and PUSCH data to the upper protocol layers 245. Doing so may enable the processor to identify (a) short term Doppler spread patterns for immediate action and (b) long term trend information to pre-emptively identify times of high Doppler spread needs as a "look ahead" function.

The following describes an example of the former case (a). Referring to FIG. 4b, if SNR estimation data (and thus receiver selection) indicates that there have been very few (or no) instances of Doppler compensation within the capture ranges $CR_{2a/b}$ corresponding to probability curves $425_{a/b}$. This may correspond to situations in which there is very little high speed traffic. In this case, process 550 may proceed via logical condition 560 to step 570, in which the processor executes instructions to de-instantiate the receivers 220 corresponding to the frequency offsets $f_c+2f_n$ and $f_c-2f_n$.

The following describes another example of former case (a). Again, referring to FIG. 4b, SNR estimation data (and thus receiver selection) may indicate many instances of rapid sweeps in Doppler compensation from the highest positive frequency offset (probability curve 425a) through zero offset (probability curve 405) through the highest negative frequency offset (probability curve 425b), whereby the duration of time at the extreme ends of Doppler offset (425a/b) are not much greater than the duration of time in the corresponding probability curves of lesser offset (e.g., 415a/b). This may indicate that there is insufficient coverage at the higher end of required Doppler compensation, and that additional receivers 220 may be needed with greater frequency offsets—in other words, to add one or more pairs of receivers at the far end of Doppler compensation. In this case, process 550 may proceed via logical condition 560 to step 560, in which the processor executes instructions to instantiate additional receivers 220 corresponding to higher frequency offsets $f_c+3f_n$ and $f_c-3f_n$.

For the latter case (b) the processor may store longer term historical data regarding SNR estimates, the number of receivers 220, and the receiver 220 selected, along with a time stamp. In this scenario, the processor may execute instructions to identify patterns that occur daily (e.g., train passage, traffic jams, etc.) and weekly. This may include identifying patterns that might indicate an upcoming need for additional or fewer receivers. Such "look ahead" algorithms and their implementations are known and within the scope of the disclosure.

The invention claimed is:

1. A wireless telecommunications base station for high-mobility scenarios, the wireless telecommunications base station comprising:
    a coordinator module configured for determining a plurality of frequency offsets relative to a carrier frequency;
    a plurality of receivers, wherein each of said plurality of receivers is configured for receiving a distict frequency offset within said plurality of frequency offsets, shifting an incoming signal at the carrier frequency by its corresponding frequency offset to generate a frequency shifted signal, and determining a signal quality measurement corresponding to its frequency shifted signal; and
    a selector/combiner module configured for receiving said frequency shifted signal and signal quality measurement from each of the plurality of receivers, generating a highest quality frequency shifted signal and sending said highest quality frequency shifted signal to upper protocol layers, wherein
    said selector/combiner module is configured for generating said highest quality frequency shifted signal by soft combining a subset of the plurality of frequency shifted signals having high corresponding signal quality measurements.

2. The wireless telecommunications base station according to claim 1, wherein said selector/combiner module is configured for generating said highest quality frequency shifted signal by selecting the frequency shifted signal corresponding to a highest signal quality measurement.

3. The wireless telecommunications base station according to claim 1, wherein each of said plurality of receivers is configured for determining said signal quality measurement by computing a SNR (Signal to Noise Ratio) corresponding to its frequency shifted signal.

4. The wireless telecommunications base station according to claim 3, wherein each of said plurality of receivers is configured for computing said SNR using a Demodulation Reference Signal (DM-RS) within its frequency shifted signal.

5. The wireless telecommunications base station according to claim 4, wherein each of said plurality of receivers is configured for computing said SNR using a Data Aided Maximum Likelihood algorithm.

6. The wireless telecommunications base station according to claim 1, wherein each of said plurality of receivers is configured for implementing a portion of a PHY layer processing of an LTE protocol stack.

7. A wireless telecommunications process for high-mobility scenarios, the wireless telecommunications process comprising:
- determining a plurality of frequency offsets;
- assigning each of said plurality of frequency offsets to one of a plurality of receivers;
- frequency shifting an incoming signal by each of said plurality of frequency offsets to create a plurality of frequency shifted signals;
- calculating a signal quality measurement corresponding to each of said plurality of frequency shifted signals; and
- generating an output signal based on the plurality of frequency shifted signals and said plurality of corresponding quality measurements, wherein
- said generating of said output further comprises: soft combining a subset of the said plurality of frequency shifted signals having a high signal quality measurement.

8. The process according to claim 7, wherein said generating of said output signal further comprises: selecting a highest quality frequency shifted signal from said plurality of frequency shifted signals.

9. The process according to claim 7, wherein said calculating of the signal quality measurement corresponding to each of said plurality of frequency shifted signals further comprises: computing a SNR (Signal to Noise Ratio) corresponding to the frequency shifted signal.

10. The process according to claim 7, wherein said calculating of the signal quality measurement corresponding to each of said plurality of frequency shifted signals further comprises: computing the SNR using a Demodulation Reference Signal within its frequency shifted signal.

11. The process according to claim 7, wherein said calculating the signal quality measurement corresponding to each of said plurality of frequency shifted signals further comprises: computing said SNR using a Data Aided Maximum Likelihood algorithm.

12. A non-transitory computer readable medium having instructions stored thereon, such that when the instructions are read and executed by one or more processors, said one or more processors is configured to perform the process of claim 7.

13. A wireless telecommunications method for high-mobility scenarios, the wireless telecommunications method comprising:
- determining a plurality of frequency offsets;
- assigning each of said plurality of frequency offsets to one of a plurality of receivers;
- frequency shifting an incoming signal by each of said plurality of frequency offsets to create a plurality of frequency shifted signals;
- calculating a signal quality measurement corresponding to each of said plurality of frequency shifted signals; and
- generating an output signal based on the plurality of frequency shifted signals and said plurality of corresponding quality measurements, wherein
- said generating of said output signal further comprises: a soft combining a subset of said plurality of frequency shifted signals having a high signal quality measurement.

14. A non-transitory computer readable medium having instructions stored thereon, such that when the instructions are read and executed by one or more processors, said one or more processors is configured to perform the method of claim 13.

15. A wireless telecommunications base station, comprising:
- a coordinator means for determining a plurality of frequency offsets relative to a carrier frequency;
- a plurality of receiver means for receiving a corresponding frequency offset, receiving a signal, applying the corresponding frequency offset to the signal to generate a frequency shifted signal, and computing a signal quality measurement corresponding to the frequency shifted signal; and
- a selector/combiner means for receiving the frequency shifted signal and signal quality measurement from each of the plurality of receiver means and generating a highest quality frequency shifted uplink signal, wherein
- said selector/combiner module is configured for generating said highest quality frequency shifted signal by soft combing a subject of the plurality of frequency shifted signals having high corresponding signal quality measurements.

* * * * *